United States Patent [19]
Cook et al.

[11] 4,194,667
[45] Mar. 25, 1980

[54] APPARATUS FOR PRESSURE WELDING METAL WORKPIECES

[75] Inventors: Lloyd A. Cook, Parkersburg, W. Va.; Kim A. Reynolds, Shelburne; Werner J. Mark, Orangeville, both of Canada

[73] Assignee: Alforge Metals Corporation, Limited, Orangeville, Canada

[21] Appl. No.: 893,220

[22] Filed: Apr. 4, 1978

Related U.S. Application Data

[62] Division of Ser. No. 711,037, Aug. 2, 1976, Pat. No. 4,094,453.

[51] Int. Cl.² .................. B23K 19/00; B23K 5/02
[52] U.S. Cl. ........................... 228/4.1; 228/44.1 R
[58] Field of Search .......... 228/4.1, 6.1 R, 44.1 R, 228/239, 240, 242, 243; 432/26, 22; 228/49 R, 5.7

[56] References Cited

U.S. PATENT DOCUMENTS

| | | | |
|---|---|---|---|
| 1,513,828 | 11/1924 | Kernohan et al. | 432/22 |
| 3,603,498 | 9/1971 | Cook et al. | 228/4.1 |
| 3,771,215 | 11/1973 | Williams et al. | 228/5.7 X |

FOREIGN PATENT DOCUMENTS

943090  2/1949  France ........................... 228/233

OTHER PUBLICATIONS

Cook and Shafer, "New Forge Welding of Al and Mg Alloys", The Welding Journal, vol. 37, No. 4 (Apr. 1958) pp. 348-358.

*Primary Examiner*—Francis S. Husar
*Assistant Examiner*—K. J. Ramsey
*Attorney, Agent, or Firm*—Arne I. Fors; Robert F. Delbridge

[57] ABSTRACT

A method and apparatus for pressure welding together novel aluminum or magnesium workpieces. Edges of workpieces to be pressure welded together are aligned with each other by abutment and one workpiece retracted from the other a predetermined distance to define an open channel between the edges. The workpiece edges are quickly heated to a temperature within the range of from about 200° to 900° F. by passing a uniform flow of heating gases through the channel such that the edge tip and sides of each workpiece are softened while the edge inner cores remain cooler and harder with their mechanical properties unaffected by the heat and the workpieces then moved into abutment with each other to close the channel and immediately pressed together under high pressure for expulsion of softened metal containing deleterious materials such as surface oxides and creation of a solid-phase weld bond between the relatively cool and hard inner cores. An air curtain can be provided to improve control of the heating of the workpieces and to enhance pressure welding together of workpieces of different gauges and of different metals, such as welding of aluminum to magnesium alloys.

2 Claims, 11 Drawing Figures

APPARATUS FOR PRESSURE WELDING METAL WORKPIECES

This is a division of application Ser. No. 711,037 filed Aug. 2, 1976, now U.S. Pat. No. 4,094,453 issued June 13, 1978.

BACKGROUND OF THE INVENTION

This invention relates to pressure welding of metal workpieces and, more particularly, is directed to a method and apparatus for pressure welding metal workpieces of high strength aluminum or magnesium alloy and to novel workpieces welded thereby.

The pressure welding of metals by cold welding and hot welding techniques is well known. Each technique has certain limitations in that cold pressure welding requires a large amount of deformation and extremely high pressures to obtain a weld and, in many cases, it has been found impossible to obtain welds at room temperature because of excessive cracking and insufficient flow of the metal. Hot pressure welding of metals such as aluminum, on the other hand, normally is conducted at a temperature in excess of 900° F. with relatively little deformation and upset. However, known hot pressure welding methods have the inherent disadvantage of overaging, recrystallizing and annealing the metals welded resulting in low joint efficiencies of about 30 to 40%.

SUMMARY OF THE INVENTION

The method of the present invention differs from the aforesaid cold and hot pressure welding techniques in that only sufficient heat is provided to the welding operation to allow the metals to flow without cracking during the welding process, without the harmful effects on the metals of overaging, recrystallization and annealing. Joint efficiencies in the welding of aluminum and magnesium alloys of at least 90%, and often in excess of 100%, can be obtained.

This invention relates to pressure welding of metal workpieces and, more particularly, is directed to a method and apparatus for pressure welding metal workpieces of high strength aluminum or magnesium alloy and to novel workpieces welded thereby.

The pressure welding of metals by cold welding and hot welding techniques is well known. Each technique has certain limitations in that cold pressure welding requires a large amount of deformation and extremely high pressures to obtain a weld and, in many cases, it has been found impossible to obtain welds at room temperature because of excessive cracking and insufficient flow of the metal. Hot pressure welding of metals such as aluminum, on the other hand, normally is conducted at a temperature in excess of 900° F. with relatively little deformation and upset. However, known hot pressure welding methods have the inherent disadvantage of overaging, recrystallizing and annealing the metals welded resulting in low joint efficiencies of about 30 to 40%.

The method of the present invention differs from the aforesaid cold and hot pressure welding techniques in that only sufficient heat is provided to the welding operation to allow the metals to flow without cracking during the welding process, without the harmful effects on the metals of overaging, recrystallization and annealing. Joint efficiencies in the welding of aluminum and magnesium alloys of at least 90%, and often in excess of 100%, can be obtained.

United States patent application Ser. No. 679,307 discloses a method of pressure welding aluminum and magnesium alloys at elevated temperatures under conditions which will enhance plastic flow of the metal during the welding operation but which will preclude overaging, recrystallization or partial annealing of the metal. The method of the present invention constitutes an improvement over the method taught in this co-pending application.

U.S. Pat. No. 3,603,498 issued Sept. 7, 1971 is directed to a welding machine for pressure welding flat sheet metal workpieces together. The apparatus of the present invention constitutes an improvement over this structure.

In general, the method of the invention comprises the steps of juxtaposing a longitudinal edge of a first workpiece gripped between a pair of dies into substantially parallel spaced alignment with a longitudinal edge of a second workpiece gripped between a second pair of dies, maintaining the longitudinal edge of the first workpiece between about 1/32 to 1 inch away from the opposed longitudinal edge of the second workpiece so as to form an elongated open rectangular channel therebetween, introducing a uniform stream of heated gases into the proximity of the opposed longitudinal edges and causing a portion of said stream of heated gases to flow through said elongated open rectangular channel, maintaining the flow of heated gases through said elongated open rectangular channel for a time sufficient to heat the surfaces of said opposed edges to a temperature within the range of from about 200° to 900° F. and to form a core of relatively cooler and harder material within each edge, eliminating said elongated open rectangular channel by moving the longitudinal edges of said workpieces into abutting relationship with each other to obviate the flow of said heated gases therethrough, and immediately applying pressure to the abutting heated longitudinal edges of said workpieces while they are at a temperature of between about 200° to 900° F. to create a solid-phase weld bond between the cores and to upset a portion of heated adjacent surfaces and cause heated metal to be substantially displaced out of the plane of said pressure welded interface.

More particularly, the method of the invention additionally comprises juxtaposing the longitudinal edges of the workpieces in opposed alignment with each other a substantially parallel, spaced distance apart by abutting the said edges of the workpieces with each other and retracting one of said workpieces a desired predetermined distance, introducing a uniform stream of heated gases into the proximity of the opposed edges by feeding a combustible mixture of gases through a plurality of equispaced apertures positioned to one side of said workpieces adjacent to the spaced opposed edges, for heating of said edges only when said rectangular channel is formed, and providing an air curtain between said combustible mixture of gases and a die.

It is a principal object of the present invention to provide an improved method of pressure welding metal workpieces by creating a solid-phase weld bond which will provide a high degree of reliability and uniformity in weld strength and weld continuity.

The forging press of the present invention for joining two metal workpieces comprises, in general, at least one pair of stationary C-shaped metal plate frames arranged in a parallel side-by-side spaced-apart relationship, a laterally movable C-shaped metal frame mounted between each pair of stationary C-shaped metal plate frames, a first pair of die holders associated with each pair of stationary C-shaped metal plate frames adapted to grip a workpiece therebetween, at least one of said die holders being mounted for movement in a vertical direction relative to the other, a second pair of die holders associated with said laterally movable C-shaped metal frame adapted to grip a workpiece therebetween, at least one of said die holders being mounted for movement in a vertical direction relative to the other, means for moving said laterally movable C-shaped metal frame between said stationary C-shaped metal plate frames whereby die holders associated with said laterally movable C-shaped metal frame can be moved towards and away from the die holders associated with said stationary C-shaped metal plate frames such that workpieces gripped therebetween can be spaced a fixed distance apart in alignment with each other prior to abutment of said workpieces for pressure welding and can be abutted together at a pressure above the yield strength of the metal of the workpieces at working temperatures sufficient to permit metal flow, and means for rapidly heating the opposed edges of said workpieces to a uniform temperature within the range of from about 200° to about 900° F. while said workpieces are spaced a fixed distance apart immediately prior to abutment for pressure welding.

It is another important object of the present invention to provide an improved pressure welding apparatus which will permit rapid and reliable production of pressure welded products.

We have found that the configuration of the longitudinal edges of the workpieces is critical to permit optimum weld efficiency with a minimum of heating time. Another object of the present invention is the provision of novel workpiece configurations which are amenable to pressure welding.

These and other objects of the invention and the manner in which they can be attained will become apparent from the following detailed description of the drawings, in which:

Figure 1:
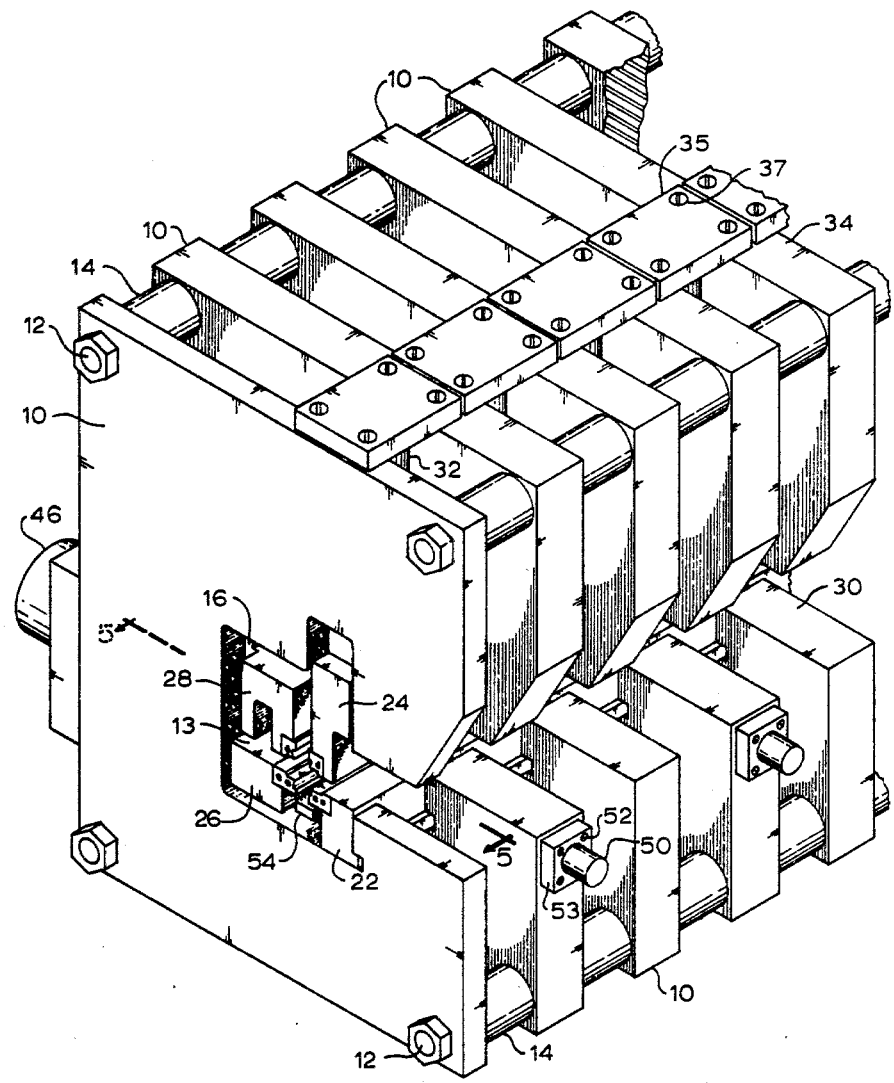
FIG. 1 is a perspective view of a portion of the machine of the present invention showing the relative layout of component parts of the machine.

With reference now to FIGS. 1-4, the forging press of the present invention comprises a plurality of stationary C-frames 10 arranged parallel to each other a uniformly spaced distance apart by tie-bolts 12 and spacers 14 located at the corners of the C-frames. A movable C-frame 16 is mounted between each pair of adjacent stationary C-frames 10 for reciprocal sliding travel on pillow blocks 17 guided by alignment rods 18 rigidly secured to spacer blocks 20 disposed between adjacent stationary C-frames 10.

This arrangement of the interconnected stationary frames 10 results in a modular type of machine which may be made any desired length by simply bolting together the desired number of stationary frames 10 and movable frames 16, the present embodiment showing six movable C-frames operating in unison as will be described in detail hereinbelow.

Figure 2:
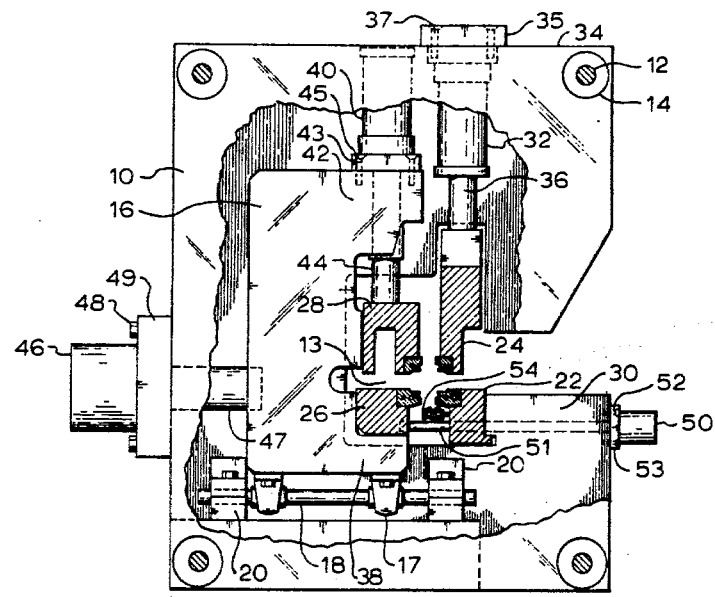
FIG. 2 is a side elevation, partly cut away, of the machine illustrated in FIG. 1.
Figure 3:
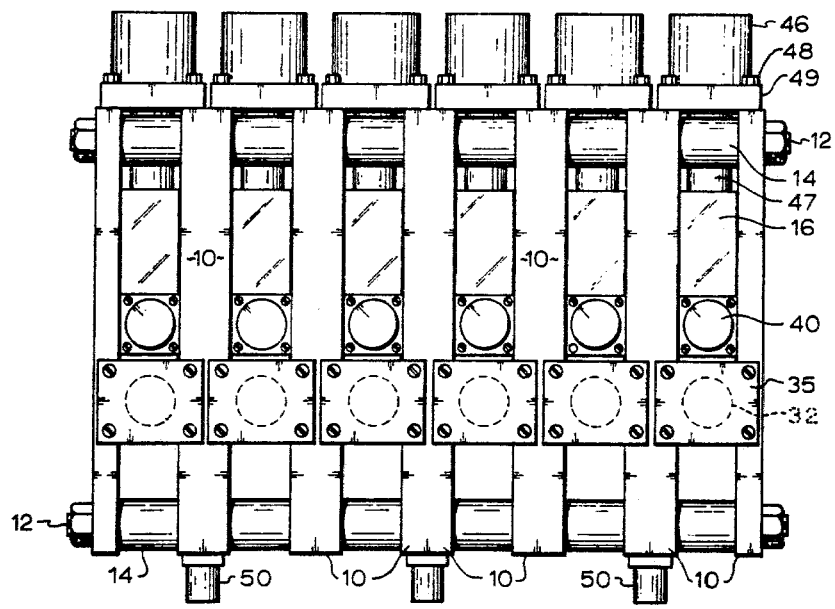
FIG. 3 is a plan view of the machine illustrated in FIG. 1.
Figure 4:
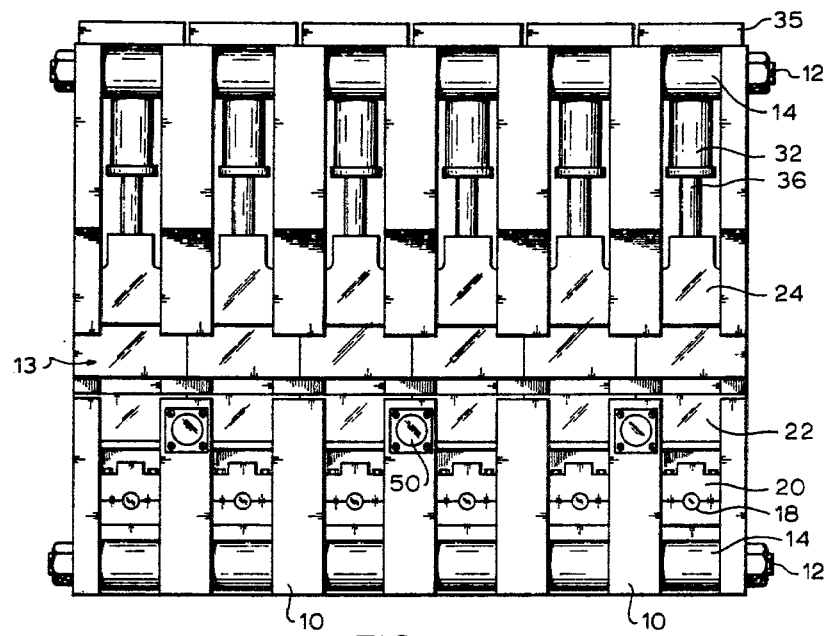
FIG. 4 is a front view of the machine illustrated in FIG. 1.

With particular reference to FIG. 2, a plurality of sets of four die holders 22, 24, 26 and 28 are positioned within the cavity defined by the jaws of stationary and movable C-frames 10, 16. Die holders 22,24 are mounted one above the other in stationary C-frames 10, die holders 22 each being rigidly secured to a lower jaw portion 30 of each frame 10 and die holders 24 each being supported by a hydraulic cylinder 32 mounted in the upper jaw portion 34 of each frame 10 by bridging plates 35 bolted thereto by bolts 37. Each die holder 24 is reciprocally vertically movable relative to a fixed die holder 22 by rod 36.

Die holders 26 are rigidly secured to lower jaw portions 38 of movable C-frames 16 and die holders 28 are each supported by a hydraulic cylinder 40 mounted in the upper jaw portion 42 of each frame 16 by flange 43 and bolts 45. Die holders 26,28 thus are movable with each movable C-frame 16, each die holder 28 being reciprocally movable vertically relative to die holder 26 by rod 44.

Each of movable C-frames 16 is laterally reciprocal by a double-acting high-pressure forging cylinder 46 connected thereto by rod 47 such that die holders 26,28 can be extended to and retracted from opposed die holders 22,24. Each forging cylinder 46 is mounted between a pair of adjacent stationary C-frames 10 and secured thereto by bolts 48 through flanges 49. A hydraulic system, well known in the art, supplies a hydraulic fluid uniformly to cylinders 46 such that all cylinders work together in unison, as will be described.

Die holders 22,24 interact to clamp a workpiece between upper and lower jaw portions 34,30 of stationary C-frames 10 and die holders 26,28 interact to clamp a workpiece between upper and lower jaw portions of laterally reciprocal C-frames 16 for abutment of the workpieces together for forge welding upon extension of forging cylinders 46.

Three detent cylinders 50 mounted on the lower jaw portions 30 of stationary clamps 10 by bolts 52 through cylinder flanges 53 extend between certain stationary clamps 10 for abutment of guide pins 51 against lower die holders 26 to positively space die holders 26 a predetermined parallel spaced distance from opposed stationary lower die holders 22 whereby workpieces clamped between dies 22',24' and 26',28' respectively can be spaced apart to define an elongated open rectangular channel 19 therebetween.

A segmented heater 54 extending the length of the lower dies 22',26' is disposed in the cavity 56 formed below said lower dies and preferably secured to stationary C-frame 10, as shown most clearly in FIGS. 5 through 8, through die holder 22 or alternatively secured to die 22'. Heater 54 consists of a plurality of six inch burner segments interconnected to form manifold 60 with outlets 58 equispaced at about ⅛ inch intervals adjacent the length of the lower dies for introducing a uniform flow of a combustion mixture of gases to achieve uniform heating of the edges of workpieces clamped by the dies. A mixture of oxygen and fuel gas such as propane has been found satisfactory to provide heat requirements of about 5500° F. to achieve a workpiece temperature of from about 200° to about 900° F.

Figure 10:
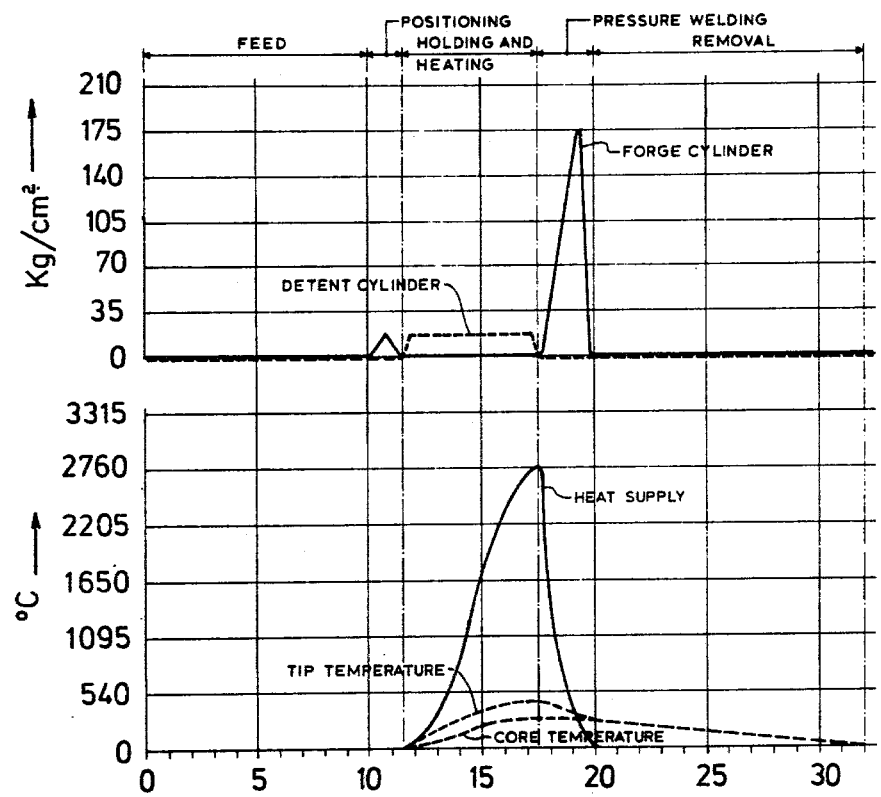
FIG. 10 is a graphical presentation of the forging pressure, detent pressure, heat supply temperature and workpiece temperature during each pressure welding cycle.

Heater 54 is adapted by valving to provide heat at a predetermined portion of the pressure welding cycle when the aforementioned rectangular channel is defined at a preset width between workpieces, as represented by the sequence of steps illustrated in FIG. 10.

Figure 7:
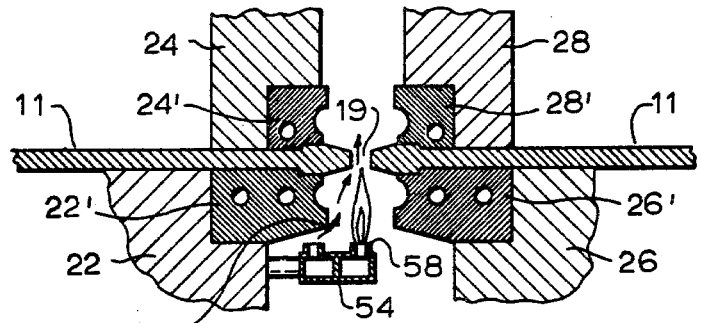
FIG. 7 is an enlarged fragmentary view of the said die holders and dies in a second position in which the workpieces are retracted to form a heating channel.

We have found optimum heating and temperature control of workpieces can be achieved by providing an air curtain designated by arrows 75 in FIG. 7 between combustible gas outlets 58 and die 22' for deflection of the heating gases through the rectangular channel 19.

Figure 5:
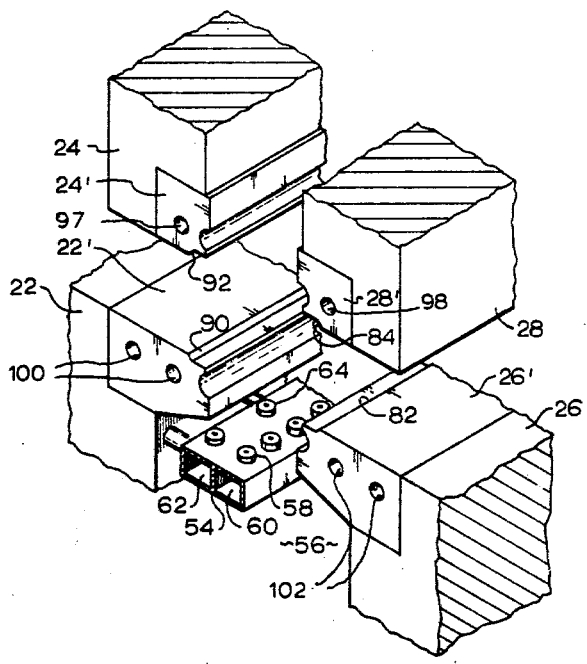
FIG. 5 is an enlarged fragmentary view of the die holders and dies of the machine of the present invention in their retracted, fully opened positions, showing the heating manifold, taken along the line 5—5 of FIG. 1.

Referring now to FIG. 5, the air curtain is provided by a plurality of jets of air discharged under pressure into cavity 56 from manifold 62 extending parallel to heater manifold 60 through the outlets 64 equispaced at a linear spacing of about ¼ inch. Relative heating of the exposed edges of workpieces defining channel 19 can be controlled by passing a desired volume of air between the source of heat from burner outlets 58 and the workpiece edge carried by dies 22',24' such that said edge is shielded from the heat supply permitting the opposed edge to be heated more rapidly. Equalization of the temperature of workpiece edges can thus be attained when the workpiece carried by dies 22',24' is normally heated to a higher temperature than the temperature of the workpiece carried by dies 26',28' due to gas flows in cavity 56. Reduction of the edge temperature of the workpiece carried by dies 22',24' relative to the temperature of the opposed workpiece may be desired when the workpieces are of different thickness or when the workpieces are of different alloy composition.

Cooling of the dies is provided by water passages in each of the upper and lower dies. A single passage 97,98 shown formed longitudinally in each of upper dies 24',28' was found to return the dies to initial die temperature of about 55° F. within 20 seconds of cessation of heating and hence before initiation of the next heating cycle. A pair of water passages 100,102, shown formed longitudinally in each of lower dies 22',26', in lieu of a single passage, can be provided if desired to accelerate cooling of the dies.

Figure 9:
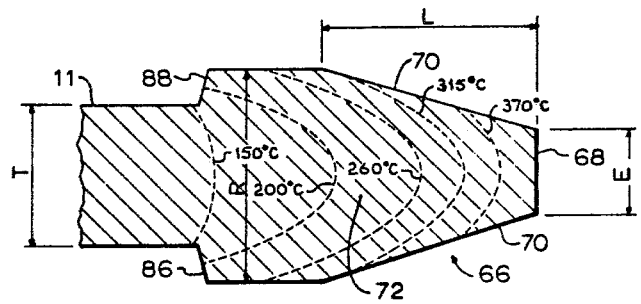
FIG. 9 is a cross-sectional view of a preferred configuration of workpieces used according to the method of the present invention.

Workpieces 11 illustrated in FIG. 9 may be formed by extrusion and each workpiece edge 66 has a nose configuration which comprises flattened tip 68 and bevelled side faces 70 to provide a cross-section with material thickness "T", root dimension "R", length dimension "L" and end dimension "E". We have found that a ratio of L:R of at least about 1.1:1, preferably in the range of from about 1.1:1 to about 1.5:1, and a ratio of E:R of at least about 0.4:1, in the range of from about 0.4:1 to 1:1, preferably about 0.5:1, are important to obtain satisfactory abutment of core material 72 with upset of surface oxides and softened metal as flash. Shoulders 86,88 formed on each workpiece for engagement by the dies can be formed, as shown, one or both shoulders spaced rearwardly remote from the nose of the workpiece, in which case R could equal T, or formed on one side only of the workpiece.

Although it will be understood we are not bound by hypothetical considerations, we believe the nose configuration aids rapid and controlled heating of workpiece edges to be pressure welded to provide a temperature gradient such that the heated edge tip 68 and side faces 70 can be laterally deformed and upset, as shown with reference to FIGS. 6 through 8 and FIG. 11, with abutment of cooler and harder inner core material 72 of each workpiece which has not had its mechanical properties adversely altered by the heat.

The steep temperature gradient provides a peripheral zone of plastic material at relatively high temperature, i.e. up to about 800° F., surrounding a core of harder material at lower temperature, i.e. up to about 450° F. During the pressure welding process the harder core material functions as a "spear" and divides and expels the soft overheated material from the weld joint. The oxide layer coating the workpieces thus is ruptured and expelled by extrusion with overheated material softened by annealing during the heating stage into the flash cavity as flash 71, to preferably increase the interface thickness at least 1.6 times the cross-sectional area of the workpiece metal. The minimum L:R ratio of 1.1:1 provides sufficient material upset for the formation of a strong weld under forging pressures unaffected by deleterious materials. A ratio of L:R of greater than 1.5:1 would result in the abutment and expulsion of excess harder core material 72 with resulting slippage of dies and inconsistency of weld uniformity. The E:R ratio range of from about 0.4:1 to 1:1, preferably about 0.5:1, provides the desired steep temperature gradient illustrated in FIG. 9, with resultant desired flow characteristics shown in FIG. 11.

In operation, a shaped workpiece 11, having a longitudinal edge on each side as shown most clearly in FIG. 9, is fed into machine cavity 13 from the side while the machine is in its open position, i.e. upper die holders 24,28 are in their raised positions and the plurality of laterally movable C-frames 16 have been retracted, to the left as viewed in FIG. 2. With reference to FIGS. 5 through 8, one workpiece 11 is clamped between die holders 22,24 of the stationary C-frames such that shoulders 82,84 formed in dies 22',24', respectively, can engage shoulders 86,88 along one edge of workpiece 11. A second workpiece 11 is fed into cavity 13 to be clamped between die holders 26,28 of the movable C-frame 16 in like manner, shoulders 90,92 in dies 26',28' adapted to engage shoulders 86,88 along the opposed edge of the workpiece.

Figure 6:
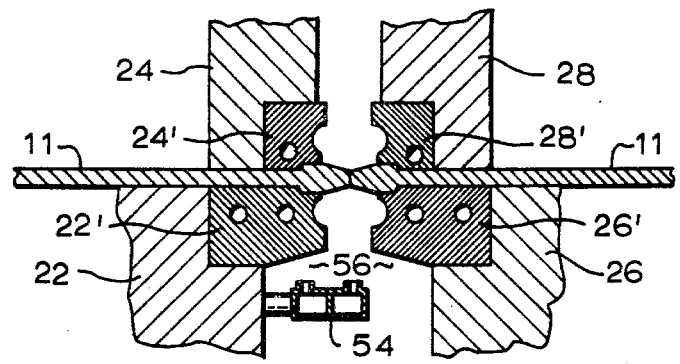
FIG. 6 is an enlarged fragmentary view of the die holders with dies shown in FIG. 6 in a first position in which the workpieces are aligned, taken along the line 5—5 of FIG. 1.

Upper die holders 24,28 are lowered to clamp the two workpieces 11, as indicated in FIG. 6, under a light clamping cylinder pressure of 200–300 psi and the opposed edges of the workpieces forced together under light pressure of from about 200–500 psi of the forging cylinders to obtain alignment thereof relative to each other and to the forging dies. The final cylinder clamping pressure of about 2200 psi, dependent on the nature of the metal welded and its thickness, is immediately applied to the die holders and maintained to the completion of pressure welding. FIG. 10 illustrates graphically the steps of the method of our invention with reference to forging cylinder pressure, detent cylinder pressure, heat supply temperature and workpiece temperature. An increase of forging cylinder pressure will be noted during the positioning step of the cycle.

The detent cylinders 50 are then actuated at a pressure above 250 psi sufficient for extension of guide pins 51, which function as stops in opposition to the forging cylinders, concurrent with reduction of the forging pressure, to space the workpieces a predetermined distance of from 1/32 to 1 inch apart, preferably about ⅛ inch apart, to define an elongated open rectangular channel 19 shown most clearly in FIG. 7.

Control valves to heater 54 are then opened, by solenoids not shown, to introduce a uniform flow of heating gases, such as oxygen and propane ignited by a pilot flame and combusted in situ, to rapidly heat the workpiece nose configurations as shown in FIG. 9. Heating of the workpieces has been found to take about 3 to 8 seconds for a metal workpiece thickness of about ¼ inch. Heat times in excess of 8 seconds have often resulted in loss of metal properties, inconsistent welds and apparent oxide inclusions at the weld joints. Heat times of about 4 to 6 seconds have resulted in a consistent and level hardness profile through the weld section with no loss of properties.

Figure 8:
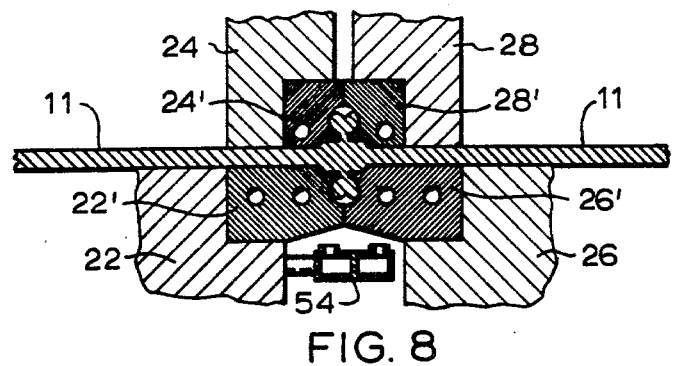
FIG. 8 is an enlarged fragmentary view of the die holders and dies in their final pressure welding position in which the workpieces are pressure welded together.
Figure 11:
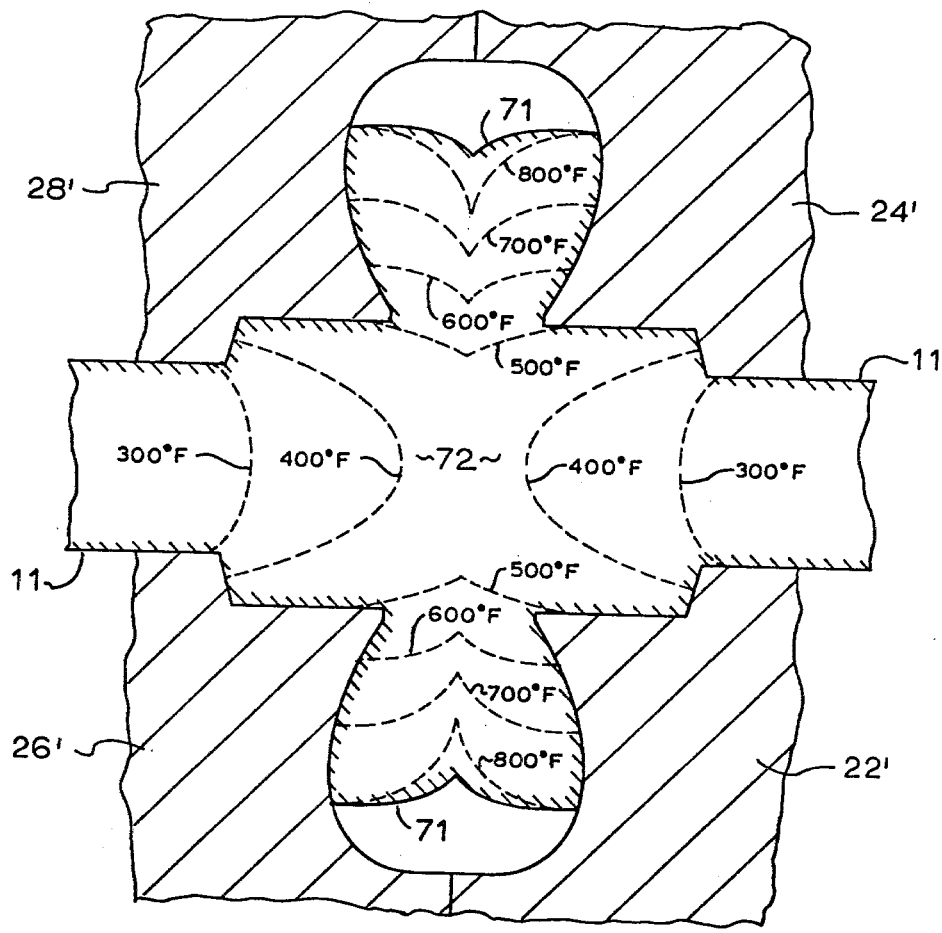
FIG. 11 is a cross-sectional view of the workpiece after completion of the pressure welding cycle indicating the disposition of heated workpiece metal upset as flash.

Detent cylinder pressure is then released and, substantially concurrent with cessation of heating of the workpieces, the forging pressure can be applied to eliminate the heating channel and bring the workpieces into abutment for about 2 to 5 seconds, normally about 3 seconds, with resultant pressure welding of the workpieces and simultaneous expulsion of flash 71 as shown in FIGS. 8 and 11.

The forging pressure is then relieved, cylinder 32 retracted to raise upper die holder 24 and release the welded workpieces from front dies 22′,24′, and the forging cylinders 46 and movable C-frames 16 connected thereto partially retracted to separate dies 26′,28′ from dies 22′,24′ and to free the resulting panel from lower die 22′. Cylinder 32 is again actuated to pinch the panel between dies 22′,24′ while rear dies 26′,28′ are separated by retraction of upper die 28′ by raising die holder 28 through cylinder 40, and forging cylinders 46 then fully retracted to free the panel from die 26′.

A walking beam table, not shown, raises the panel about one-half inch above the lower dies 22′,26′ and partially draws the panel out of the machine so that the rearward edge of the panel can be pressure welded to the next workpiece fed to the machine by a repeat of the forge welding cycle.

It is essential for successful pressure welding that machine alignment be maintained throughout each welding cycle, i.e. the front and rear lower dies be maintained in the same horizontal plane, each of the pairs of rear upper and lower dies and the front upper and lower dies be maintained in their respective vertical planes, and symmetry of die faces be provided along the length of the machine. We have found the use of alignment rods 18 sliding within pillow blocks 17 effectively aligns the front and rear lower dies in the same plane. Vertical alignment of each pair of upper and lower dies is provided by the configurations of the stationary and movable C-frames and symmetry of die faces is ensured by abutment of front and rear dies with each other as indicated in FIG. 8, or by abutment of lower die holders with each other, not shown.

Pressure welding of aluminum workpieces having "T" thicknesses of 0.140, 0.210 and 0.220 inch thickness has been conducted successfully on aluminum alloys designated 6063-T6, 6061-T6, 6351-T6, 5456-H111, 7005-T53 and 7075-T6 and, with the exception of 7075-T6, 100% joint efficiencies have been obtained through the weld. Joint efficiency of about 90% was obtained for the 7075-T6 alloy and tests have indicated 100% joint efficiency can be obtained for this alloy by increasing the forging capacity of the machine or reducing the cross section of the workpiece.

Tests conducted on the workpiece shown most clearly in FIG. 9, extruded from the aluminum alloy 6061-T6, with shoulders 86,88 formed thereon for engagement by the dies, as has been described, are exemplary of tests conducted on the aforementioned alloys. A shoulder 86,88 of 0.060 inch thickness on each side of the workpiece, to provide a resulting root dimension R of 0.330 inch for material thickness T of 0.210 inch, resisted slippage of the workpieces in the dies and permitted satisfactory welds. Optimum expulsion of flash 71 with removal of oxides and of material heated over 500° F., as shown most clearly in FIG. 11, was obtained by a length dimension L of 0.375 inch and end dimension E of 0.155 inch, providing an L:R ratio of 1.14:1 and an E:R ratio of 0.47:1.

The present invention provides a number of important advantages. Workpieces of high strength aluminum or magnesium can be pressure welded together by the method and apparatus of the invention to provide a solid-phase weld bond having physical characteristics substantially equal to the characteristics of the parent metal welded. Not only are undesirable effects from the use of excess heat from conventional forge welding obviated, but weld strengths greater than the strength of the parent metals welded can be obtained. Heating and pressure welding of workpieces can be quickly effected in less than 10 seconds, with a complete welding cycle, including assembly and alignment of workpieces and removal of finished panel, taking place in about one-half minute. Complex extrusions of either open or closed sections, having suitable welding edges, can be joined to form integral panels. Thus workpieces in desired shapes can be formed using relatively inexpensive extrusion presses and a multiplicity of shaped workpieces quickly pressure welded together to form continuous panels of desired length and structural configurations without loss of physical properties of the parent metal welded.

Panels formed of pressure welded aluminum extrusions have been successfully incorporated in dump trailers and dump bodies to increase load capacity by lowering vehicle weight.

It will be understood, of course, that modifications can be made in the embodiment of the invention illustrated and described herein without departing from the scope and purview of the invention as defined by the appended claims.

I claim:

1. A forging press for joining two metal workpieces together by pressure welding comprising:
 (a) at least one pair of stationary C-shaped metal plate frames arranged in a parallel side-by-side spaced-apart relationship, (b) a laterally movable C-shaped metal frame mounted between each pair of stationary C-shaped metal plate frames, (c) a first pair of die holders associated with each pair of stationary C-shaped metal plate frames adapted to grip a workpiece therebetween, at least one of said die holders being mounted for reciprocal movement in a direction towards and away from the other, (d) a second pair of die holders associated with said laterally movable C-shaped metal frame adapted to grip a workpiece therebetween, at least one of said die holders being mounted for reciprocal movement in a direction towards and away from the other, (e) means for moving said laterally movable C-shaped metal frame between said stationary C-shaped metal plate frames comprising a double-acting forging cylinder rigidly secured to the stationary C-shaped metal plate frames and operatively connected to said movable C-shaped metal frame and a detent cylinder rigidly secured to said stationary C-shaped metal plate frames and operatively connected to said movable C-shaped metal frame in opposition to the forging cylinder whereby die holders associated with said laterally movable C-shaped metal frame can be moved towards and away from the die holders associated with said stationary C-shaped metal plate frames such that workpieces gripped therebetween can be spaced a predetermined distance apart in alignment with each other prior to abutment of said workpieces for pressure welding and can be abutted together at a pressure above the yield strength of the parent material at working temperatures sufficient to permit metal flow, and (f) means for rapidly heating the opposed edges of said workpieces to a uniform temperature within the range of from about 200° to about 900° F. while said workpieces are spaced a fixed distance apart immediately prior to abutment for pressure welding including a heat source uniformly disposed along the spaced edges of the opposed workpieces comprising a manifold assembly disposed adjacent one of said dies having a plurality of outlets disposed at equal intervals along the length of the said die adapted to introduce a flow of a combustible mixture of gases to achieve said uniform heating of the opposed edges of the workpieces.

2. A press as claimed in claim 1 which additionally comprises means for introducing a curtain of air between the heat source and adjacent die for directing the flow of heating gases towards a rectangular channel defined between the opposed edges of the workpieces.

* * * * *